UNITED STATES PATENT OFFICE.

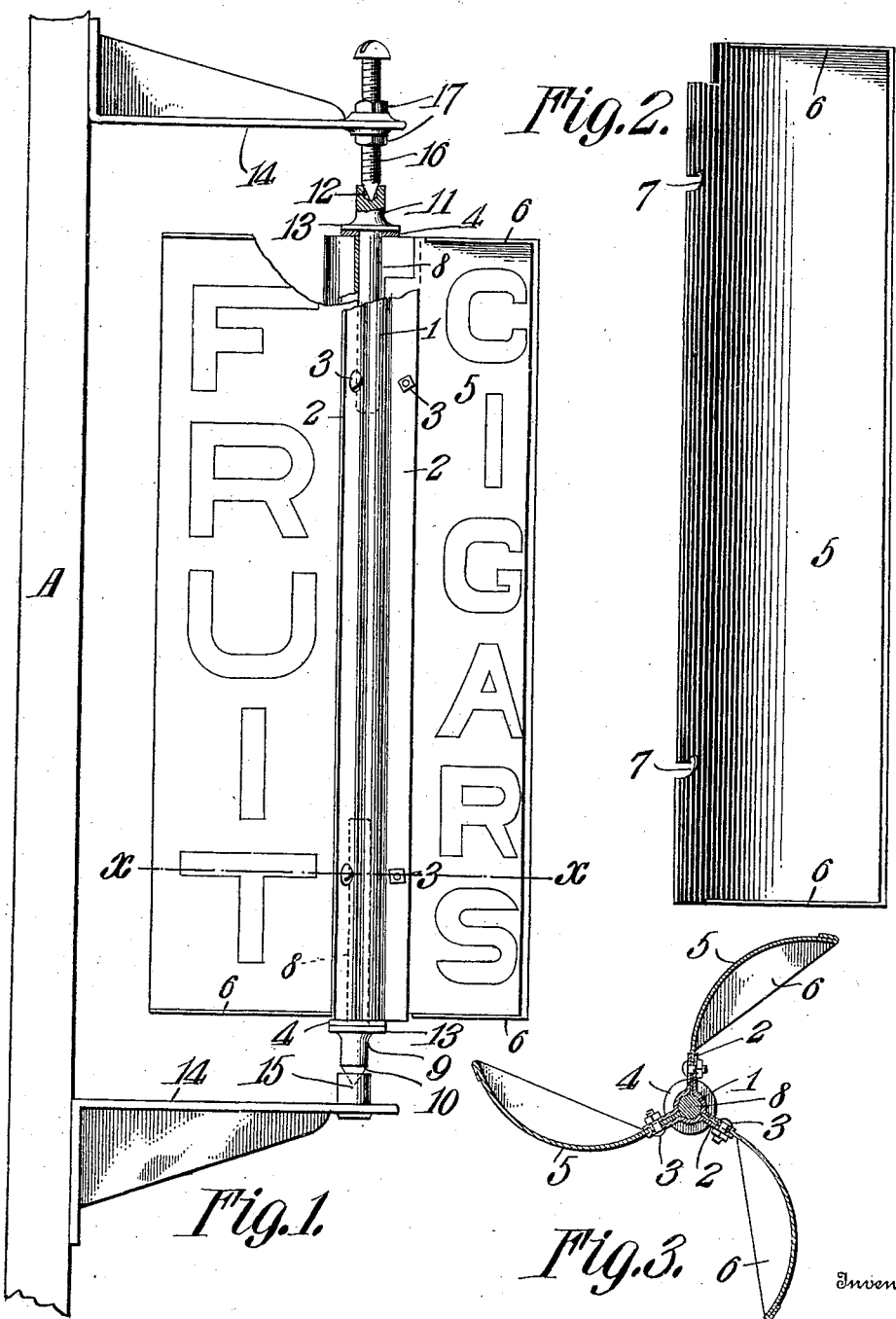

FRED F. BARRATT, OF CLEARFIELD, PENNSYLVANIA.

SIGN.

No. 917,988.    Specification of Letters Patent.    Patented April 13, 1909.

Application filed February 17, 1908. Serial No. 416,357.

*To all whom it may concern:*

Be it known that I, FRED F. BARRATT, a citizen of the United States, residing at Clearfield, in the county of Clearfield and State of Pennsylvania, have invented a new and useful Sign, of which the following is a specification.

This invention relates to movable signs of that character designed to be operated by wind and the object of the invention is to improve upon the construction of devices of this character and to provide novel means whereby the wings of the sign can be detachably secured in place.

A further object is to provide a core for the sign which is made up of a plurality of wing spacing devices, said core constituting a holder for bearing devices.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is an elevation of the sign a portion of the wings being broken away. Fig. 2 is a detail view of one of the wings. Fig. 3 is a section on line $x$—$x$, Fig. 1.

Referring to the figures by characters of reference, 1 designates a core section consisting of an elongated metallic strip having longitudinal flanges 2 along the edges thereof and disposed preferably at an angle of about one-hundred-twenty degrees, the intermediate portion of said strip being curved to constitute one-third the circumference of a cylinder. Three of these sections are utilized and it will be apparent therefore that when they are assembled as indicated in Fig. 3 they will form a cylindrical core having three pairs of radial flanges. The flanges of each pair are designed to be secured together by means of bolts 3 or in any other preferred manner and the ends of the floor sections are preferably permanently connected by means of rings 4 which are soldered or otherwise secured thereto.

The wings 2 of each pair are preferably spaced apart a sufficient distance to permit the insertion therebetween of one longitudinal edge of a wing 5. One of these wings is provided for each set of flanges 2. Each wing extends the full length of the core and is concavo-convex in cross section. Each wing is preferably formed of sheet metal and is provided at its ends with segmental heads 6 whereby the wing is reinforced transversely and pockets are produced for the reception of the air currents. The longitudinal edge portion of the wing located between the flanges 2 extends beyond the heads 6 and is provided with inwardly and upwardly extending slots 7 designed to detachably engage the bolts 3. After the wings have been thus placed in engagement with the bolts they can be clamped between the flanges by tightening said bolts as is obvious.

Extending into each end of the core 1 is a pintle 8 and one of these pintles is provided with a head 9 terminating in a point 10 while the other pintle has a head 11 provided with an end socket 12. Both heads have annular flanges 13 designed to bear on the rings 4.

The means employed for supporting the sign in operative position consists of two brackets 14 designed to be fastened to a suitable supporting structure A and one of these brackets has a socketed bearing block 15 thereon into which the point 10 projects while the other bracket is provided with a bearing screw 16 pointed so as to project into the socket 12. Locking nuts are mounted on the screw at opposite sides of the bracket as indicated at 17 so as to prevent the screw from turning after it has once been properly adjusted.

It is designed to utilize wings with suitable reading matter upon them, the letters or other characters upon the concave faces of the wings being the same while the characters on the convex faces of the wings are also designed to coincide so that when the sign is rotating the characters upon the two faces of the wings will be visible and can be read at the same time. It is also designed to form the two faces of each wing of different colors so that when the sign is rotating it will attract attention in a more efficient manner. Should it be desired to change the wording of the sign the blades can be readily removed simply by loosening the screws 3 and other blades with different words or characters thereon can be substituted therefor.

When the sign is suspended in the manner described and shown it will obviously be rotated by currents of air directed thereagainst. If desired the sign can be caused to rotate in the opposite direction by utilizing blades having slots 7 positioned opposite to those shown in Fig. 2.

It will be seen that a device constructed as herein described is light and durable, and by mounting it in the novel manner described the same will easily rotate. This rotation is facilitated by reason of the fact that the two pintles are capable of rotation within the core. By disposing the bearing block 15 and the head 11 in the positions shown they can be utilized as cups for holding a suitable lubricant.

What is claimed is:

1. A revoluble sign comprising parallel similar core sections, each section having longitudinal flanges at the edges thereof, said flanges radiating therefrom, bearing devices arranged between the ends of the core sections, means engaging the flanges of said sections for binding the sections upon said bearing devices, and wings insertible between the adjoining flanges of the core sections, each wing having slots extending into one edge thereof for the reception of the binding means within the flanges.

2. A revoluble sign comprising a tubular core, wings radiating therefrom, pintles revoluble within and extending beyond the ends of the core, and end bearings for the pintles.

3. A revoluble sign comprising a tubular core, wings radiating therefrom, pintles revoluble within and extending beyond the ends of the core, heads upon the outer ends of the pintles, bearing rings upon the ends of the core and contacted by the heads, and bearings for the outer ends of the heads.

4. In a revoluble sign a wing concavo-convex in cross section and having segmental heads at the ends thereof, one edge portion of said wing having inwardly and upwardly extending fastener receiving slots.

In testimony that I claim the foregoing as my own, I have hereto affixed my signature in the presence of two witnesses.

FRED F. BARRATT.

Witnesses:
　JAS. M. WALKER,
　WM. J. NEALE.